United States Patent [19]

Harrison

[11] Patent Number: 4,607,469
[45] Date of Patent: Aug. 26, 1986

[54] SEAL FOR WATER PROOFING A UTILITY LINE CONDUIT AND A METHOD OF FORMING THE SEAL

[75] Inventor: George W. Harrison, Houston, Tex.
[73] Assignee: Team, Inc., Alvin, Tex.
[21] Appl. No.: 600,526
[22] Filed: Apr. 16, 1984

Related U.S. Application Data

[63] Continuation-in-part of Ser. No. 567,651, Jan. 3, 1984, abandoned.
[51] Int. Cl.$^4$ .................... B02D 29/10; B04F 17/08; B32B 31/06
[52] U.S. Cl. ........................... 52/220; 52/232; 138/89; 174/77 R; 264/261; 264/263; 264/272.13; 264/DIG. 80; 339/94 A
[58] Field of Search .............. 264/DIG. 80, 263, 261, 264/272.13; 52/220, 221; 174/48, 49, 77, 151; 248/56; 339/94 A; 52/232; 138/89

[56] References Cited

U.S. PATENT DOCUMENTS

| | | | |
|---|---|---|---|
| 2,202,617 | 5/1940 | Bishop | 264/261 X |
| 3,210,608 | 10/1965 | Appleton | 174/151 X |
| 4,061,344 | 12/1977 | Bradley et al. | 174/151 X |
| 4,086,736 | 5/1978 | Landrigan | 52/221 |
| 4,189,619 | 2/1980 | Pedlow | 174/48 |
| 4,237,667 | 12/1980 | Pallucci et al. | 52/221 |
| 4,245,445 | 1/1981 | Heinen | 52/221 |
| 4,419,535 | 12/1983 | O'Hara | 174/48 |
| 4,445,304 | 5/1984 | Koda | 52/221 X |
| 4,454,381 | 6/1984 | Ito et al. | 174/77 R X |

FOREIGN PATENT DOCUMENTS

| | | | |
|---|---|---|---|
| 2551693 | 6/1977 | Fed. Rep. of Germany | 52/221 |
| 2632325 | 1/1978 | Fed. Rep. of Germany | 248/56 |
| 2732735 | 1/1979 | Fed. Rep. of Germany | 52/220 |
| 366045 | 12/1938 | Italy | 52/220 |
| 2040107 | 8/1980 | United Kingdom | 248/56 |

OTHER PUBLICATIONS

Ishibashi, M.; H. Kobayashi; M. Makiyo, "Development of Fire-Stopping Materials for Wiring System," in *Proceedings of the 25th Wire and Cable Symposium*, Cherry Hill, N.J., U.S.A., Nov. 16-18, 1976, pp. 333-339.

*Primary Examiner*—Philip Anderson
*Attorney, Agent, or Firm*—Guy E. Matthews

[57] ABSTRACT

A method of and apparatus for sealing tubular conduits carrying one or more utility lines provided therein that do not totally displace the void is disclosed. The method and apparatus include spacing a plurality of dams along the axis of the conduit and defining a cell penetrated on opposite sides by the line or lines and thereafter pressuring the cell with a silicone or RTV rubber and exposing the cell to moisture sufficient to cause the resin to cure.

10 Claims, 6 Drawing Figures

SEAL FOR WATER PROOFING A UTILITY LINE CONDUIT AND A METHOD OF FORMING THE SEAL

CROSS REFERENCE TO RELATED APPLICATIONS

This application is a continuation-in-part of U.S. patent application Ser. No. 567,651, filed Jan. 3, 1984, and now abandoned by George W. Harrison, entitled "Waterproofing a Utility Line Conduit".

BACKGROUND OF THE INVENTION

1. Field of the Invention

This invention relates to methods of sealing a conduit surrounding a utility line passing through a wall, one side of which is exposed to water, and the other side of which demarcates an area to be kept dry; and especially, the invention involves waterproofing electrical power line conduits entering underground vaults or basement walls.

2. Description of the Prior Art

Public utilities commonly run power lines underground through conduits which enter and leave underground vaults, typically of a concrete or masonry construction, that are accessed, for example, through ceiling towers to manholes, or by other service manways. Similarly, telephone lines, television cables and other public or private lines are run underground within the protective shield of a conduit for collection or distribution at underground vaults. The underground vault may be a power station and may contain switching and/or distribution junctions and/or transformers or other equipment which can be shortened or damaged by vault flooding, with potential loss of service to the customers of the utility and life endangering work situations for the utility company's workmen who enter the vault. A similar flooding problem is often presented in underground basement levels of building equipment rooms, where utility lines enter through conduits in the subterranean walls of the building.

In all these and other comparable situations in which an underground run of utility line shielded in a conduit is admitted into an underground vault, a source of water entrance into the vault is through the conduit itself. Water entry into an underground vault through underground conduit can be severe. For example, a power company's underground concrete vault measuring 10'×10'×20' and located in a coastal area in a Western state was consistently flooded with some 15,000 gallons of water within a 48 hour period from water entering the vault essentially through underground electrical power line conduits. Until the development and utilization of the hereinafter described invention to solve this problem of water entry to an underground vault, conventional efforts such as occluding the conduit inlet ports inside the vault walls with caulking materials or expanding plugs fitted around the power line had proven unsuccessful.

Another difficulty with electrical line conduits entering underground vaults is that power surges in the electrical lines cause line movement, and where several lines are carried by one conduit, the occurrence of water in the conduit can increase the risk of possible line to line power arcing and shorting, with consequent electrical failure.

Another method which applicant believes was unsuccessful was to use two oppositely disposed, spaced apart foam rubber flanges acting as dams which were to be fit around the electrical lines inside a conduit and along the axis of the conduit. Spacers were used between the flanges, with bolts, nuts and the spacers mounted on plates which abut the flat sides of the flanges. The nuts were tack welded to the most interior plates abutting the most interior flange. Accordingly, a cell was formed between the two dams, penetrated on opposite sides by the electrical lines and also the bolts running through the spacers. The cell was to be filled with oil or similar fluid and the dams compressed by use of the bolts. This structure is similar to that of FIG. 5 but with foam rubber dams. Applicant learned of this method and apparatus just prior to applicant's invention.

SUMMARY OF THE INVENTION

It is an object of this invention to provide a method of sealing a conduit surrounding a utility line in such a manner that the presence of water itself is utilized to contribute to sealing.

It is an object of this invention to provide a method of preventing entry of water past a wall below ground level through underground conduit carrying a utility line admitted in the wall.

It is an object of this invention to waterproof an underground electrical line conduit such that the electrical line within the conduit is supported in an elastic medium which accommodates line movement during power surges, and which creates a waterproof seal wherever water might be found in the conduit.

In accordance with the invention, these objects are satisfied by fitting, within the electrical line conduit, and about the electrical line or lines inside the conduit, a plurality of dams, spacing the dams apart within the conduit along the axis of the conduit to define a cell that is penetrated on opposed sides by the electrical lines. The walls of the cell which form the dams are of solid rubber and are compressed so that the rubber forms a sealing surface with the conduit and the lines or lines. The cell is then pressurized in a two step procedure with a thixotropic, moisture activated, room temperature curable, dimethylpolysillxane or dialkylpolysillxane which are generally referred to as silicone or room temperature vulcanized ("RTV") rubber. The silicone or RTV rubber reacts with available water within and at the boundaries of the cell to form silanol groups which cure to form a resilient silicon rubber seal. Resin within the cell which does not hydrolize remains unpolymerized to provide a thixotropic reservoir which is yieldable to accommodate line movement under power surges and which is a standby reserve ready to polymerize to provide further sealing action upon any subsequent intrusion of water into the cell at places which have not previously experienced water intrusion.

It is an object of this invention to provide a method of preventing entry of water past a wall below ground level through underground conduit carrying a utility line admitted in the wall.

DESCRIPTION OF THE DRAWINGS

For a further understanding of the nature and objects of the present invention, reference is made to the following diagrams in which like parts are given like reference numerals, and wherein.

DESCRIPTION OF THE INVENTION

Figure 1:
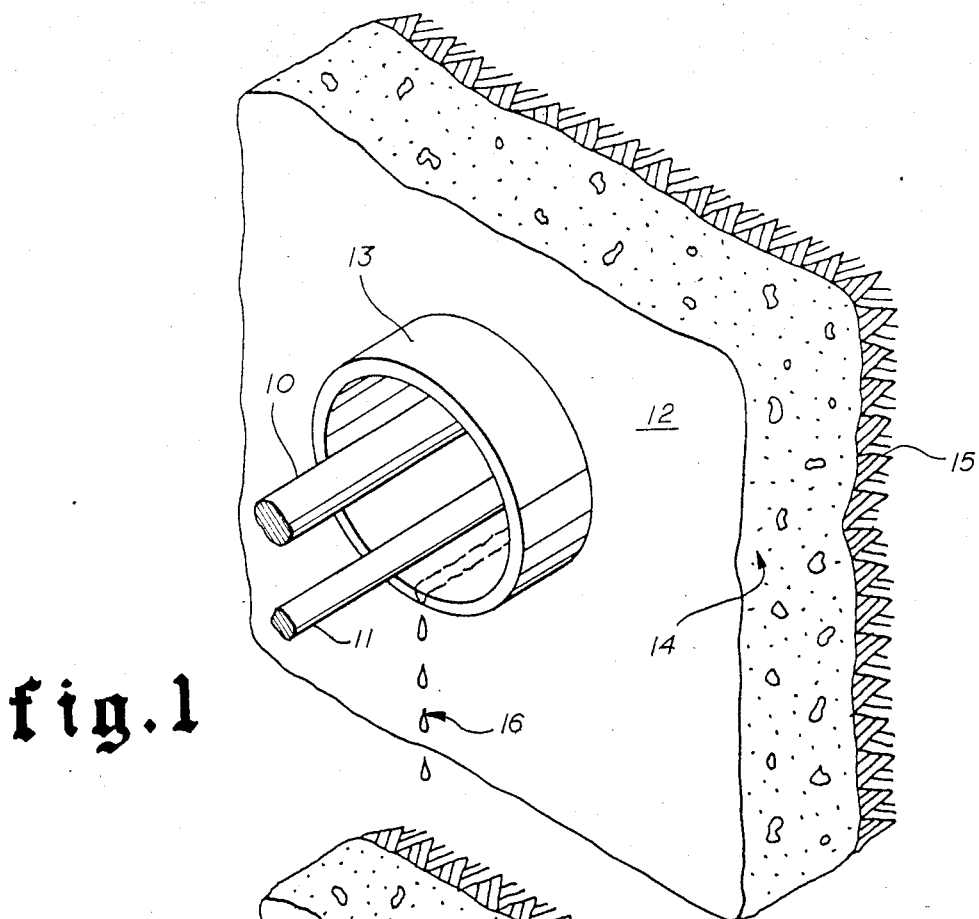
FIG. 1 is a perspective cutaway, schematic view of an electrical line conduit passing through a wall.

Referring to FIG. 1, a plurality of electric power lines 10, 11 enter an underground vault 12. The lines are shielded within a conduit 13 which passes through an underground wall 14 separating the vault 12 from earth 15. Reference 16 indicates moisture being admitted into the vault 12 by water flowing in the lumen of the conduit 13.

Figure 2:
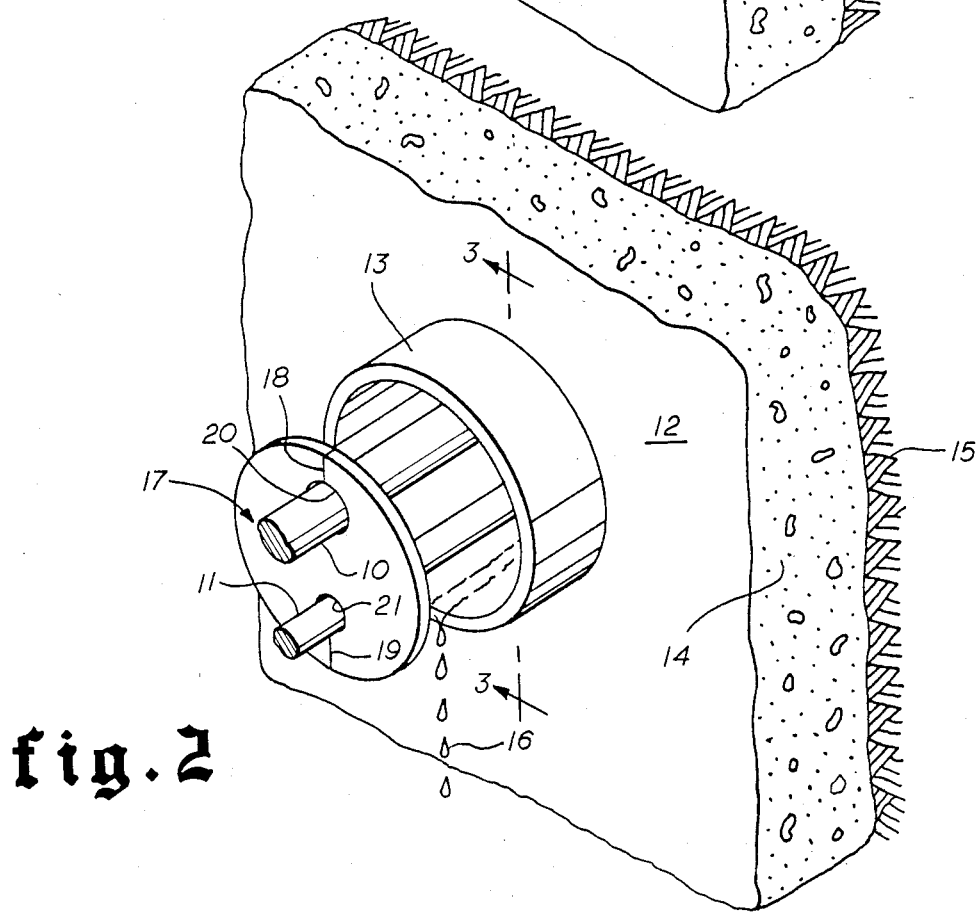
FIG. 2 is a perspective cutaway view of a dam fitted over the electrical line run within the conduit illustrated in FIG. 1.
Figure 3:
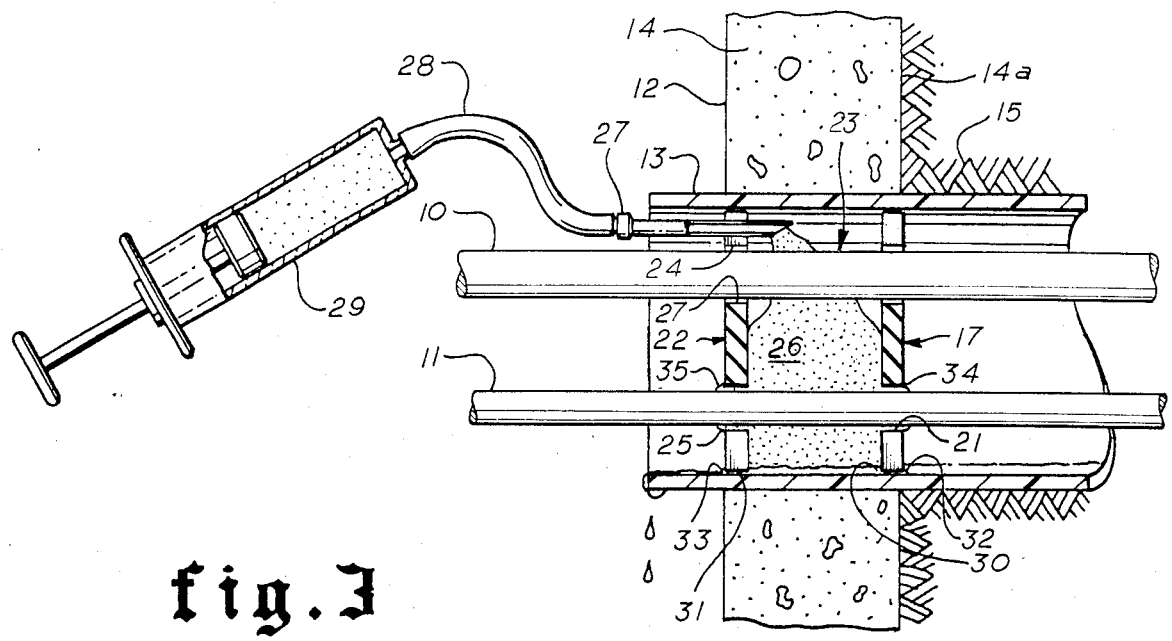
FIG. 3 is a sectional view along the lines 3—3 of FIG. 2 illustrating within the conduit a cell undergoing pressurization.

Referring to FIG. 2, a dam 17 is illustrated fitted about each of electrical lines 10 and 11. The dam suitably is a rubber disk, preferably solid, having an outer diameter approximating the inner diameter of conduit 13. Foam rubber disks, such as in the prior art, are not preferred. Suitably the outer diameter of dam 17 is not less than about ¼ of an inch less than the inner diameter of conduit 13. The rubber dam is fitted about electrical conduits 10 and 11 by slicing the dam 17, from a peripheral edge inwardly, as illustrated at 18, the distance of the center line of power line 10 from the inner wall of conduit 13; a similar slice 19 is made for power line 11. At the inner terminus of slice 18, an aperture 20 of diameter approximating the diameter of power line 10 is cut; similarly an aperture 21 for power line 11 is formed into slice 19. Dam 17 is then fitted over electrical power lines 10, 11 by slipping the dam at slice 10 over power line 11 until it seats into aperture 20, and by slipping the dam 17 over power line 11 at slice 19 until the power line seats into aperture 21. Alternately one continuous slice could be made from a peripheral edge of dam 17. Dam 17 is then pushed along line 10, 11 into conduit 13 preferably until lined up with the exterior face 14a of wall 14, as illustrated in FIG. 3. In the same matter, a second dam 22 is fitted within conduit 13 about electrical lines 10, 11 inside the conduit and is spaced from dam 17 along the axis of conduit 13 to define a cell indicated generally by reference numeral 23. Cell 23 is defined by the inner periphery of conduit 13 and by dams 17, 22, and is penetrated on opposite sides of dams 22, 17 by electrical power lines 10, 11, the penetration being in apertures 20 and 21, respectively, for dam 17, and in apertures 23, 25 for dam 22.

Figure 5:
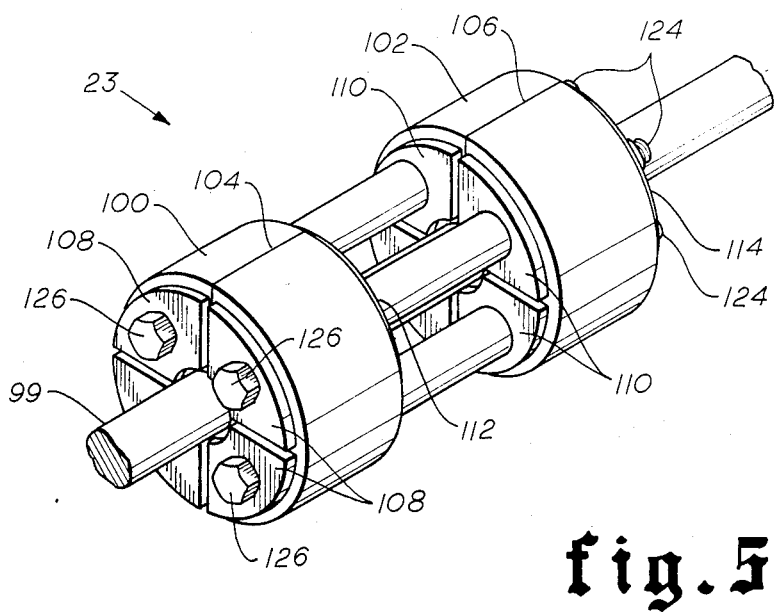
FIG. 5 is a perspective, cutaway view of the preferred embodiment of the apparatus of the cell of the present invention.
Figure 6:
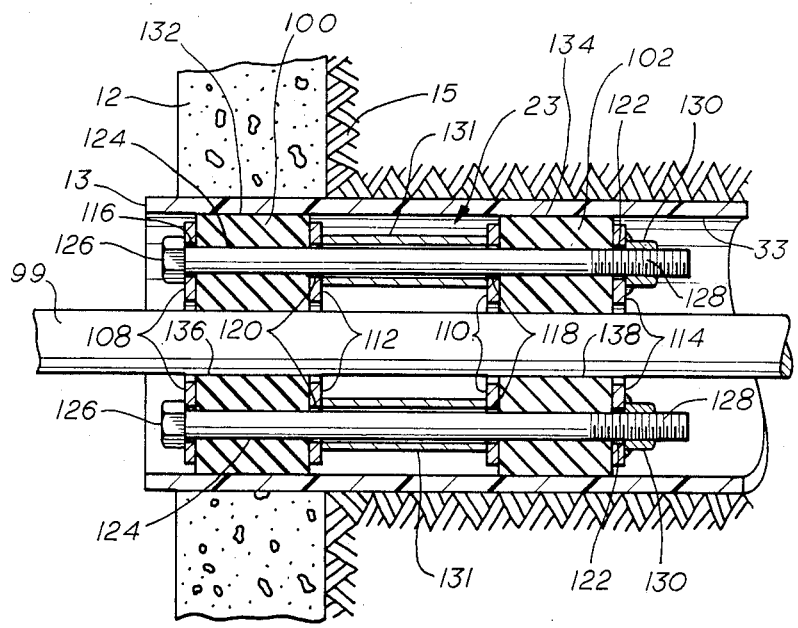
FIG. 6 is a partial sectional view of the preferred embodiment of the apparatus of the cell of the present invention shown in FIG. 5.

The details of alternate mechanical apparatus to define a cell 23 are shown in FIGS. 5 and 6. A single electrical line 99 is shown in FIGS. 5 and 6 to simplify explanation. The cell 23 includes two solid rubber flanges 100, 102. Each flange 100, 102 includes a slit 104, 106, respectively, which is different from slits 18, 19 discussed above. Slits 104, 106 traverse the full length of the flanges 100, 102, respectively, thereby bifurcating each of slits 104, 106 into two approximately equal segments. The cutting of the flanges 100, 102 into two parts is preferable. Each flange 100, 102 further includes a first set of quarter-circular metal plates 108, 110, respectively, facing towards the inner surface of vault 12 and a second set of quarter-circular metal plates 112, 114, respectively, facing towards the earth 15. Each quarter circular plate includes one hole, such as holes 116, 118, 120, 122, for plates 108, 110, 112, 114, respectively, with corresponding holes in the flanges 100, 102. Threaded bolts 124, having heads 126 and threaded portion 128, extend from plates 108 through plates 110, 112, 114. Nuts 130 coaxial with and of the same size as holes 116, 118, 120, 122 are attached, such as, for example, by tack welding, on the face of plates 114 to receive the threading 128. Alternately, plates 114 may be tapped, and the nuts 130 eliminated. Spacers 131 are placed between plates 110, 112 to maintain the interior space of the cell. It should be noted that Marine type fittings should be used for plates 114, bolts 124 and nuts 130 because these will be exposed to water and sometimes corrosive salt water.

Each assembly of a flange, two oppositely disposed plates and a slit comprise one of the dams, the assembly including flange 100 corresponding to dam 22 and the assembly including flange 102 corresponding to dam 17.

After assembling the cell 23, the bolts 124 are torqued up by turning heads 126, placing flanges 100, 102 in axial compression. The outer peripheral surfaces 132, 134 and inner peripheral surfaces 136, 138 of the flanges 100, 102, respectively, radially distort (FIG. 6) under the pressure applied by the plates as a result of the torquing to form sealing surfaces with the inner surface 33 of conduit 13 and the outer surface of the electrical line 99. The torquing also seals slits 104, 106. Foam rubber would not be satisfactory for this purpose because it tends to internally compress. In addition to the sealing effect of the compression, the pressure from the flanges 100, 102 tends to bow the conduit 13 outwardly against concrete 14. Usually the conduit 13 is made of PVC, and when the concrete 14 dries around it on initial setting, the concrete tends to shrink from the PVC. The pressure from the flanges 100, 102 therefore tends to restore the contact between conduit 13 and concrete 14 and to shut off water flowing around the exterior of the conduit 13.

After cell 23 is made up, as discussed in detail above referring to FIGS. 5 and 6, cell 23 is then filled under positive pressure with a thixotropic, moisture activated, room temperature curable, silicone or RTV rubber, indicated generally by reference numeral 26. Suitable resins for such purposes are General Electric paste-consistency, adhesive sealants product numbers RTV102, RTV103, RTV108, and RTV109 available from General Electric Co., Silicone Products Division, RTV Products Department, Waterford, N.Y., and described in its Product Data Brochure CDS-1527E. Also suitable are General Electric RTV106 and RTV116, which are paste-consistency, adhesive sealants, especially adapted for high temperature applications. Another suitable such sealant is Dow Corning Silicone Rubber Sealant Part No. 732 available from Dow Corning Corporation, Midland, Mich.

These paste-consistency, adhesive sealants involve silicone or RTV rubber which, on exposure to moisture at room temperature, hydrolize and form silanol groups that cure to form resilient silicone rubber seals. Preferably, these sealants are mixed with synthetic fibers, such as teflon or asbestos, for bridging capability with a mix of fiber lengths, such as one-quarter inch for longer fibers, and short fibers of one-sixty-fourth inch and shorter.

The process of filling cell 23 is illustrated in FIG. 3, wherein a needle 27 is fitted to a hose 28 connected to a dispensing apparatus 29 filled with the silicone resin mixed with synthetic fiber to be introduced into cell 23. The dispensing apparatus may be as simple as a collapsible aluminum squeeze tube, a caulking cartridge, or for larger jobs, a dispensing unit connected by an extrusion pump to a bulk container.

As the first step of a two step procedure dam 22 is penetrated with the needle, and the dispenser 29 is activated to extrude the resin through hose 28 and needle 27 into cell 23. Being thixotropic, the resin flows only under the compressive force applied to it in the cylinder of dispenser 29. The resin is expelled into the cell 23 until it substantially fills the cell. Pressure of filling is continued in order to flow the thixotropic resin out of the gap, as indicated at 30, 31, between the periphery of portions of dams 17, 22 and the inner circumference of conduit 13, as well as out any gaps or voids in apertures 21, 25 of dams 17, 22 unfilled by the body of power line 11 such as when three power lines (not shown) abut. Similarly, the thixotropic resin flows out of any of apertures 20, 24 in dams 17, 22 unfilled by the body of power line 10. When all such gaps are bridged by resin, needle 27 is withdrawn. Preferably, the material is then permitted to dry, filling any voids as discussed above. The curing time for the resin to set in the bridged voids is approximately one-quarter to one hour depending on the amount of water present. It should be noted that where the conduit 13 is dry, water must be inserted to insure curing. This is done either by prewetting the electrical lines 10, 11 and conduit 13 or by mixing the resin with water. After the first injection of resin has cured, needle 27 is reinserted, and more resin under pressure is introduced into cell 23 to substantially fill all remaining space as the second step. This resin remains pressurized within cell 23. With regard to the second insertion of resin, there is no concern for adherence of the resin to the surrounding structures because the cell 23 is now a closed unit.

Curing of the resin occurs on exposure to atmospheric moisture or other water as discussed above, and consequently, curing occurs at all surfaces within the cell where the cell was wetted with water and occurs wherever the resin was extruded through gaps, such as gaps 30, 31 (if they still exist after the bolts are torqued) or apertures 21, 25, 20, 24 (if they exist after the bolts are torqued) or where they may exist in other electrical line situations not shown, such as three abutting lines, and exposed to atmospheric or other humidity or water. The cure process begins with formation of a skin on the exposed surface of the sealant and progresses inwardly through the material. At 25° C. (77° F.) and 50% relative humidity, the GE RTV products referred to hereinabove will form a surface skin which is tact free to the touch in the range from 15 to 60 minutes depending on the water. Higher temperatures and higher humidity or water content will accelerate the curing process; lower temperatures and lower humidity will slow the cure rate.

Figure 4:
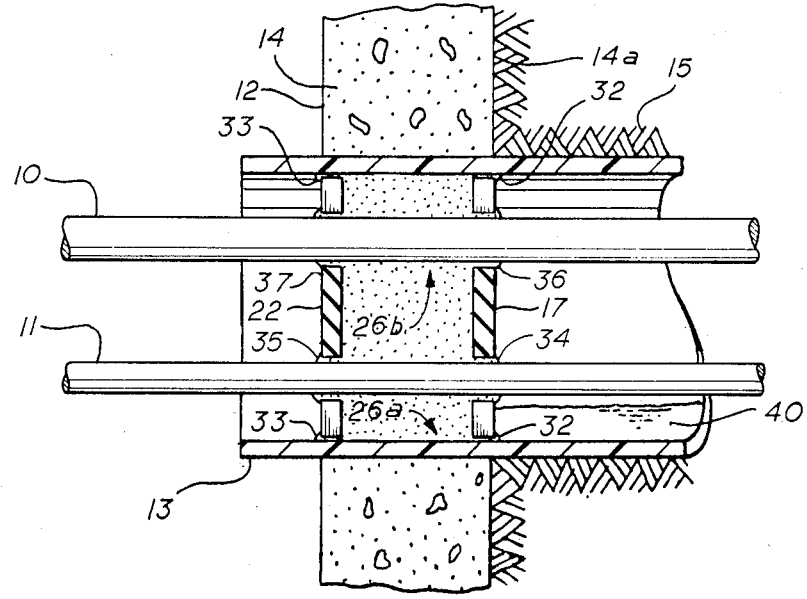
FIG. 4 is cross sectional view similar to FIG. 3 showing the seal resulting from the process illustrated in FIG. 3.

Referring to FIG. 4, an electrical line conduit 13 passing through wall 14 from its course through earth 15 to vault 12 is provided with the cellular seal comprising the plurality of dams 17, 22 bonded to the inner circumference of conduit 13 at 32, 33 by the rubber seal and, where necessary, by a cured silicone resin. The resin has cured inwardly into the cell 23 (cure is symbolically indicated as at reference number 26a), and some of the resin remains uncured (symbolically indicated more interiorly within the cell 23 at reference numeral 26b as discussed above). The cured material is flexible, and contains a Shore A hardness of about thirty. The water 40 is completely sealed from admittance into vault 12 through conduit 13 by dam 17 and silicone resin bonds 32, 34, and 36 and the pressure exerted by flanges 100, 102 on the conduit 13 to force it against concrete 14. Similarly, the moisture in the air will cause back-up bonds 33, 35, 37 to form with dam 22 and the interior of the conduit 13 and the exterior of lines 11, 10, respectively. It should be noted that where the rubber properly forms a seal in FIGS. 5 and 6 and no voids exist, the bonds 32, 33, 34, 35, 36 are shown in a highly exagerated form and may not extend beyond the rubber sealing surface of flanges 100, 102 with conduit 13 and lines 10, 11. The elastomeric quality of cell 23, comprising dams 17, 22 and the cured 26a resin and uncured 26b resin, supports and separates electrical lines 10, 11. The elastomeric nature of the cellular seal accommodates power line movement during power surges. The uncured resin 26b provides a thixotropic reservoir which accommodates and cushions the line movement and provides a standby reserve of curable resin ready to polymerize to provide further sealing action upon any subsequent intrusion of water into the cell where such uncurred material is located.

In summary, the method for producing the seal and the resultant seal of the present invention is embodied in the use of damming means providing a seal against flow of ambient water through a designated confined cell space 23 within a conduit having at least one electrical cable 10, 11, 99 extending through the conduit. A sealant body 26 is confined with the cell space as partially a paste consistency liquid 26b disposed within the body wherein no reactant has reached the sealant and partially a cured flexible solid 26a in the semblance of a rind on the exterior surface of the sealant body and in leakage protrusions from the sealant body into leakage spaces 21, 25, 20, 24, 30, 31 wherein the sealant has been in contact with a water reactant. A solid rubber disc damming means 22, 17 is loosely fitted within the conduit and around the electrical cable and respectively spaced apart to define the ends of the confined cell space 23 wherein the sealant has formed a rind 26a of sealant protruding into spaces between the conduit and the damming means and also between the electrical cable and the damming means.

The sealant body is adapted, in the event that relative movement occurs between any of, the conduit, the damming means and the electrical cable sufficient to disrupt a portion of the seal 32, 33, 34, 35 effected by the rind, to leak a measure of the liquid portion of the sealant body into the disrupted portion of the rind sufficient to fill any portion subject to leakage with this measure of sealant contacting the reactant and subsequently curing into a flexible solid.

The damming means is adapted to receive additional paste-consistency sealant under pressure into the sealant body to join and replenish the paste-consistency liquid portion 26b of the sealant body. The additional sealant may be injected through a needle 27 penetrating a wall of the damming means 22. Each of the damming means 22, 17, 100, 102 is a solid elastomer and may be adapted to be axially compressed and thereby to be radially expanded into better sealing contact with the conduit means and the electrical cable. The sealant is a thixotropic room temperature composition of paste-consistency which reacts with water to cure into a flexible solid.

While a single embodiment of the invention has been described herein, many variations thereof may be made without departing from the spirit of the invention as discussed above. Accordingly, it is intended that the scope of the invention be limited only by the claims which follow.

I claim:

1. A seal against flow of ambient water through a designated confined cell space within a conduit having at least one electrical cable extending through the conduit, comprising in combination:
   (a) a sealant body confined within said cell space as
      (1) partially a paste-consistency liquid disposed within said body wherein no reactant has reached said sealant, and
      (2) partially a cured flexible solid in the semblance of a rind on the exterior surface of said body or in leakage protrusions from said sealant body into leakage spaces wherein said sealant has been in contact with a water reactant;
   (b) solid rubber disc damming means loosely fitted within said conduit and around said electrical cable and respectively spaced apart to define the ends of said confined cell space wherein said sealant has formed a rind of sealant protruding into spaces between said conduit and said damming means and also between said electrical cable and said damming means; and
   (c) said sealant body being adapted, in the event that relative movement occurs between any of said conduit, said damming means and said electrical cable sufficient to disrupt a portion of the seal effected by said rind, to leak a measure of the liquid portion of said sealant body into the disrupted portion of said rind sufficient to fill any portion subject to leakage with said measure contacting said reactant and subsequently curing into a flexible solid.

2. The seal of claim 1 adapted to receive additional paste-consistency sealant under pressure into said sealant body to join and replenish the paste-consistency liquid portion of said sealant body.

3. The seal of claim 2 wherein said additional paste-consistency sealant is received under pressure into said sealant body through needle means penetrating said damming means.

4. The seal of claim 1 wherein each of said damming means is a solid elastomer and is adapted to be axially compressed and thereby to be radially expanded into better sealing contact with said conduit means and said electric cable.

5. The seal of claim 1 wherein said sealant is a thixotropic room temperature cured composition of paste-consistency which reacts with water to cure into a flexible solid.

6. A method of providing a seal against flow of ambient water through a designated confined cell space within a conduit having at least one electrical cable extending through the conduit, comprising the steps of:
   (a) installing solid rubber disc damming means within said conduit in loosely fitted relation within said conduit and around said electrical cable and in spaced apart relation to define the ends of said confined cell space;
   (b) injecting a sealant body under pressure into said space to be confined as
      (1) partially a paste-consistency liquid within said sealant body wherein no reactant has reached said sealant; and
      (2) partially a cured flexible solid in the semblance of a rind on the exterior surface of said sealant body or in leakage protruding from said body where said sealant body comes into contact with a water reactant during and following said injection step;
   (c) whereby said sealant forms a flexible solid rind protruding into spaces between said conduit and seal damming means and also between said electrical cable and said damming means; and
   (d) said sealant body being adapted, in the event that relative movement occurs between any of, said conduit, said damming means and said electric cable sufficient to disrupt a portion of the seal effected by said rind, to leak a measure of said liquid portion of said sealant body into the disrupted portion of said rind sufficient to fill any portion subject to leakage with said measure contacting said reactant and curing into a flexible solid.

7. The method of claim 6 including a subsequent step of injecting additional paste-consistency sealant under pressure into said sealant body of sealant to join and replenish said paste-consistency portion of said sealant body.

8. The method of claim 6 wherein each of said damming means is a solid elastomer which is axially compressed during installation to radially expand the elastomer into better sealing contact with said conduit means and said electrical cable.

9. The method of claim 6 wherein said sealant is a thixotropic room temperature cured composition which reacts with water to cure into a flexible solid.

10. The method of claim 7 wherein said additional paste-consistency sealant is injected through needle means penetrating said damming means.

* * * * *